United States Patent

[11] 3,552,265

| [72] | Inventor | Calvin M. Lucas<br>Bartlesville, Okla. |
|---|---|---|
| [21] | Appl. No. | 772,553 |
| [22] | Filed | Nov. 1, 1968 |
| [45] | Patented | Jan. 5, 1971 |
| [73] | Assignee | Phillips Petroleum Company<br>a corporation of Delaware |

[54] METHOD AND APPARATUS FOR FACING THERMOPLASTIC PIPE
1 Claim, 7 Drawing Figs.

[52] U.S. Cl. .................................................. 90/21,
90/14; 144/118; 156/258
[51] Int. Cl. ...................................................... B23c 3/12,
B27c 1/00, B31b 31/18
[50] Field of Search ........................................... 90/164, 14,
21, 21.1, 11; 83/(Inquired); 144/118;
51/(Inquired); 156/258, 159, 511

[56] References Cited
UNITED STATES PATENTS

| 98,696 | 1/1870 | Kurtz ............................ | 144/118 |
|---|---|---|---|
| 3,400,030 | 9/1968 | Burger ........................... | 156/258X |

*Primary Examiner*—Gil Weidenfeld
*Attorney*—Young and Quigg

ABSTRACT: An apparatus and method for facing the ends of a pair of thermoplastic pipe joints preparatory to joining them by a heat fusion process. The apparatus includes a rotatable disc assembly provided with planing means. As a joint of pipe is fed toward the disc assembly, the planing means conditions its leading edge forming a smooth, squared end.

PATENTED JAN 5 1971

INVENTOR.
C. M. LUCAS

BY Young and Quigg

ATTORNEYS

INVENTOR.
C. M. LUCAS
BY Young and Quigg
ATTORNEYS

METHOD AND APPARATUS FOR FACING THERMOPLASTIC PIPE

BACKGROUND AND SUMMARY OF THE INVENTION

This invention relates to butt fusion of thermoplastic pipe. In one aspect the invention relates to shaping the ends of a pair of pipe joints preparatory to joining them by the butt fusion operation.

The ends of thermoplastic pipe as manufactured have irregularities which must be squared to present a smooth surface for bonding the pipe together by the butt fusion process. Heretofore, the ends were squared by axially aligning the joints to be joined and sawing off minute axial portions of the confronting ends. The joint to be added and an end portion of the existing pipeline were placed in clamps so that the confronting surfaces to be joined were axially spaced, the spacing conforming to that of a pair of milling wheels. With the pipe so positioned, the rotating milling wheel sawed the end portions off thereby squaring the surfaces to be fused. The sawing action was time consuming and frequently produced burrs which had to be removed prior to the fusion operation.

The present invention provides for a novel method and cutting mechanism which not only improves the condition of the pipe ends but reduces the time required for their preparation.

The invention contemplates the use of a pair of axially spaced discs, each disc being provided with radially extending cutting blades presenting an axial cutting edge. The discs are positioned between the randomly spaced but axially pipe portions so that each end to be conditioned confronts a cutting disc. The pipe joint to be added to the existing line is moved towards the held portion of the existing line, bringing the end portions into engagement with their respective cutting discs. The rotating blades plane the end portion much in the manner of a jointer. Thus, it will be appreciated that the spacing of the end portions need not be controlled and that since the planing action requires penetration of only a small axial dimension of the pipe, the overall time required to condition the ends is substantially reduced. Furthermore, the planing action produces a smooth surface free of burrs. The method and apparatus of this invention can be used with any thermoplastic pipe capable of being joined by the butt fusion process.

Briefly then, the objects of this invention may be summarized as follows: to improve the condition of the ends of thermoplastic pipe preparatory to joining them by the butt fusion process, and to reduce the time required for joining pipe by providing an apparatus which rapidly conditions the end of the pipe.

DRAWINGS

DESCRIPTION OF THE PREFERRED EMBODIMENT

Figure 1:
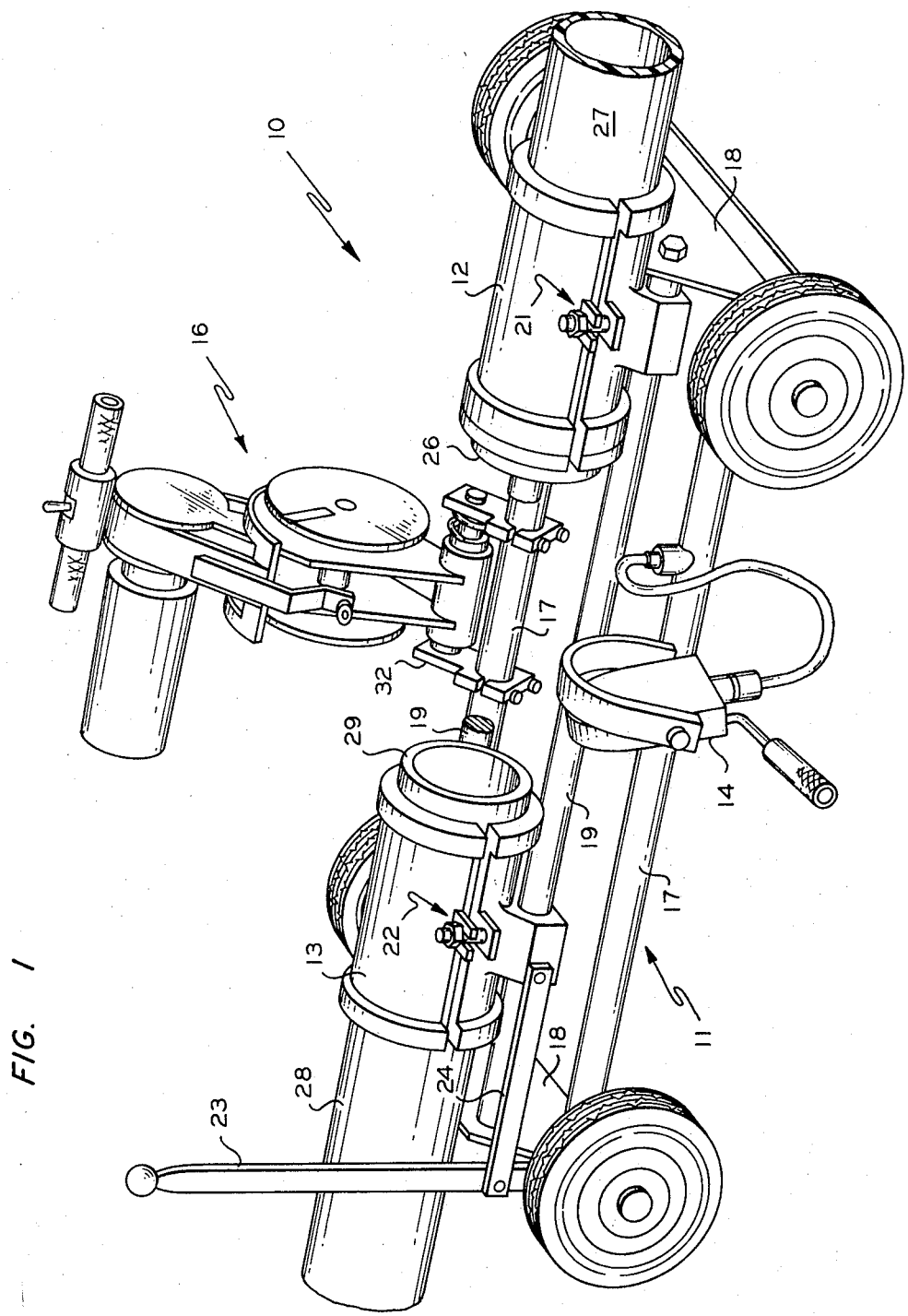
FIG. 1 is a perspective view of a pipe-joining apparatus provided with the novel cutting mechanism of this invention.

As shown in FIG. 1, a pipe-joining machine 10 constructed according to this invention is seen to include a wheel-mounted frame 11 which supports a stationary clamp 12, a movable clamp 13, a heating element 14 and a pipe-cutting mechanism shown generally as 16. The frame 11 includes a pair of longitudinal members 17,17 interconnected by a pair of cross braces 18,18. A pair of traversing bars 19,19 extend parallel to the longitudinal frame members 17,17 substantially the entire length of the frame 11. The stationary clamp 12 is secured to the traversing bars 19,19 and includes latching means shown generally as 21. The movable clamp 13 is slidably mounted on the traversing bars 19,19 and is also provided with latching means 22. A hand lever 23 pivotably mounted on the frame 11 is connected to the movable clamp 13 by link 24 so that pivotal movement of the handle 23 moves the movable clamp 13 along traversing bars 19,19 in a fore and aft direction. The heating element 14 is pivotably mounted to the frame 11 by means not shown and is adapted to be moved into the space separating the clamps 12 and 13. The clamp 12 is adapted to support an end portion 26 of the existing pipeline, a portion of which is illustrated as 27. A joint 28 of the pipe to be added to the pipeline 27 is securely clamped in the clamp 13 presenting an end portion 29 aligned with end portion 26 of the existing pipeline 27. Now, as contemplated by this invention and as described in detail below, the cutting mechanism 16, mounted on frame member 17 by clamps 32, 32 is moved into the space-separating end portions 26 and 29 and is operative to face the end portions 26 and 29 to provide a smooth bonding surface.

Figure 2:
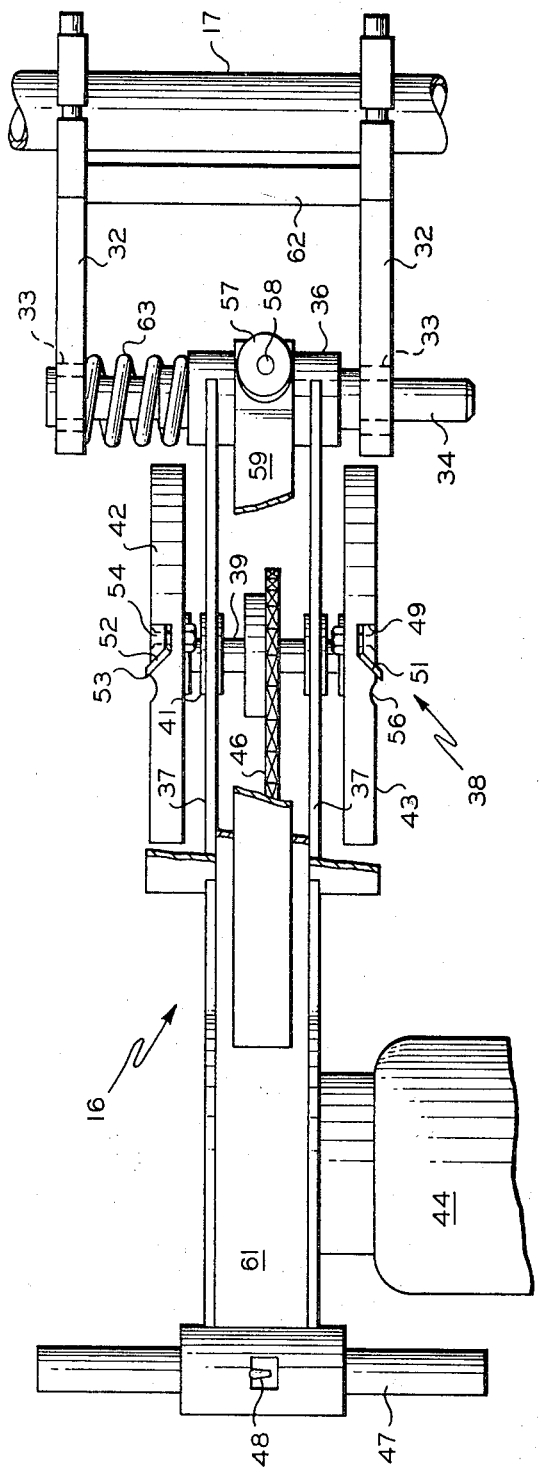
FIG. 2 is a plan view of the cutting mechanism shown detached from the joining apparatus.
Figure 3:
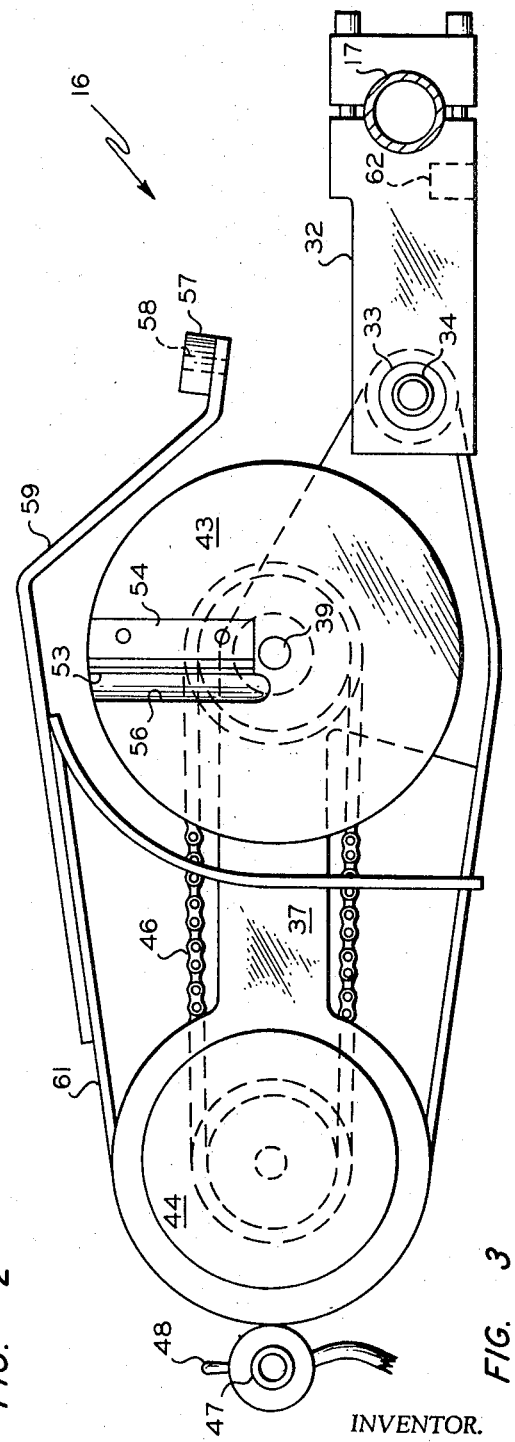
FIG. 3 is an elevational view of the cutting mechanism shown in FIG. 2.

As best seen in FIGS. 2 and 3, the cutting mechanism 16 is secured to the frame 11 by means of a pair of mounting clamps 32,32 which clamp the mechanism 16 to one of the longitudinal members 17. The outer ends of the clamps 32,32 are provided with suitable openings in which are mounted bushings 33,33. The bushings 33,33 slidably and pivotally support a stub shaft 34. A sleeve 36 is keyed to the shaft 34 at a point intermediate the clamps 32,32. A pair of plate members 37,37 extend outwardly from the sleeve 36 and provide means for supporting a disc assembly, shown generally as 38, and its associated drive means. The disc assembly 38 is provided with pipe conditioners which upon rotation face the transverse ends 26 and 29 of the plastic pipe joints.

The disc assembly 38 includes a shaft 39 journaled to the plate members 37,37 by bearings 41,41. The outer end portions of shaft 41, which are disposed on opposite sides of the plate members 37,37 carry discs 42 and 43. The discs are rotated by means of an electric motor 44 mounted on one of the plate members 37 and drivingly connected to the shaft 39 by a chain and sprocket assembly shown as 46. A handle 47 provided with an electric switch 48 is mounted at the outer extremity of members 37,37. Thus it will be appreciated that the parts supported by plate members 37,37, e.g., motor 44 and disc assembly 38, are pivotably movable about the shaft 39 between an inoperative position wherein the discs 42 and 43 are angularly removed from the axis of the pipe (See FIG. 4) to an operating position wherein the axis of rotation of the discs 42 and 43 coincides with the axis of the pipe (See FIG. 5).

The discs 42 and 43, which may be cast of inexpensive material such as aluminum, each have formed therein a radially extending groove 49. The leading side of the groove is provided with a slant surface 51. A blade 52 fits into the groove 49 and lying on the slant surface 51 presents a cutting edge 53 axially spaced from the surface of its associated disc 42 or 43. A block 54 conforming to the configuration of the groove 49 if bolted in place and thereby maintains the blade 52 in assembled relation. Bordering the cutting edge 53 and in advance thereof in the direction of rotation is a chip groove 56. The blade 52, formed of high quality steel, extends substantially the entire length of the groove 49 so that a wide range of pipe diameters may be accommodated thereby. Since the discs 42 and 43 are generally identical in structure, like reference numerals for corresponding parts have been assigned to both.

In order to maintain the assembly in the operating position (FIG. 5) a roller 57 is provided. The roller 57 is mounted on a pin 58 carried at the outer extremity of an angulated arm 59. The arm 59 is bolted to a guard plate 61 interconnecting the members 37,37. In the operating position, the roller 57 engages a bar 62 interconnecting clamps 32,32. The geometry of the arm 59 is such that with the roller 57 resting on the bar 62, the axis of rotation of discs 42 and 43 coincides with the axis of end portions 26 and 29.

Figure 6:
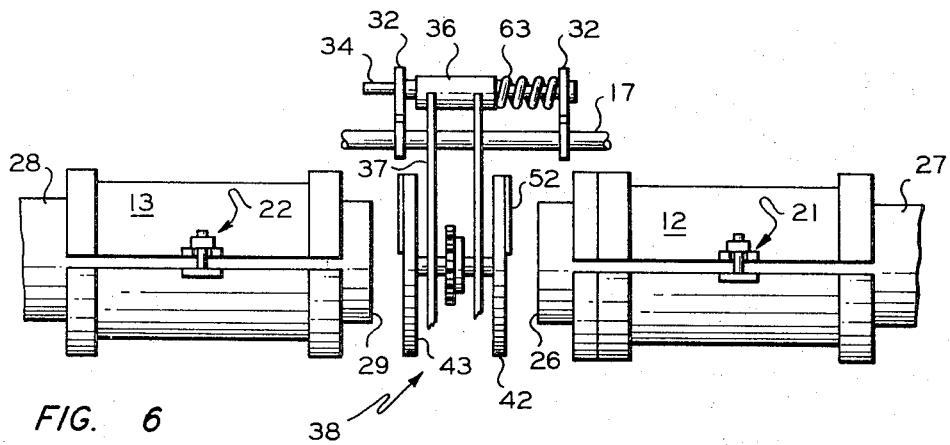
FIGS. 6 and 7 are simplified fragmentary side elevation views of the pipe-joining apparatus illustrating two stages in the pipe facing operation.

A compression spring 63 urges the movable portion of the cutting mechanism 16 towards the joint 28 to be added (see FIG. 6). Since the portion is slidably movable along shaft 34, the roller 57 engaging bar 62 maintains the disc assembly 38 in axial alignment with the pipe ends 26 and 29.

Figure 4:
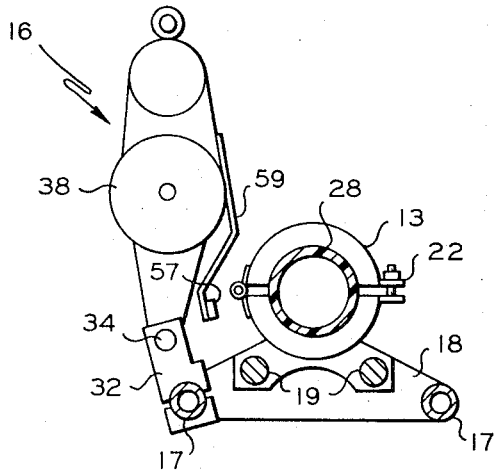
FIGS. 4 and 5 are diagrammatic views showing the two positions of the cutting mechanism relative to the pipe.
Figure 5:
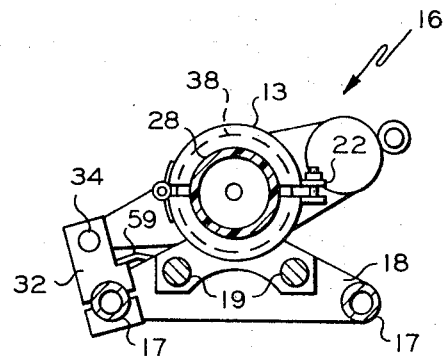
Figure 7:
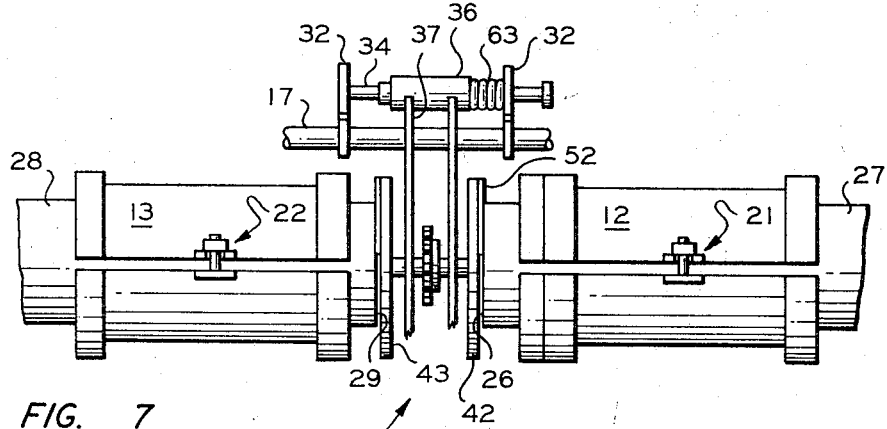

The operation of the cutting mechanism of this invention will be described with reference to FIGS. 1, 4—7. At the beginning of the operation end portion 26 of the existing pipeline 27 is placed in clamp 12 and secured therein by the latching means 21. Similarly the joint to be added, 28, is secured in clamp 13 to present a portion 29 confronting portion 26. The confronting portions 26 and 29 are axially spaced to permit the insertion of the disc assembly 38 by manipulation of handle 47. With the mechanism 16 in the operating position (FIG. 5), disc 43 confronts portion 29 and disc 42 confronts portion 26. Now, by actuating the hand lever 23 the movable clamp 13 moves portion 29 towards the rotating disc 43. As the portion 29 forcefully engages the face of disc 43 the disc assembly 38 is moved against the bias of spring 63 towards the end portion 26 of the existing line 27. The movement of the disc assembly 38 brings disc 42 into engagement with end portion 26 as shown in FIG. 7. The rotating discs 42 and 43 by the action of their respective cutting edges 53 planes the end portions 26 and 29 thereby providing a smooth bonding surface. At the conclusion of this operation, the movable clamp 13 is returned to its home position, the disc assembly 38 removed as shown in FIG. 4, and the heating element inserted in the space separating end portions 26 and 29. Again, the end portion 29 is moved towards the heating element bringing both portions 29 and 26 into engagement with opposite sides thereof. The thermoplastic pipe is heated to the fusion temperature of the material used. The heating element 14 is then removed and the portions 26 and 29 are butted together completing the fusion process.

Thus it has been demonstrated that the cutting mechanism of this invention provides a simple and rapid means for facing the ends of thermoplastic pipe to be joined by the fusion process and provides for an improved bonding surface.

I claim:

1. An apparatus for facing ends of a pair of joints of thermoplastic pipe, comprising:

a frame;

means on said frame for axially aligning and spacing end portions of said joints one from another; and rotatable disc means mounted on the frame and being movable between an operating position at which said disc means if disposed between said end portions of the joints and an inoperative position at which said disc means is laterally moved therefrom, said disc means in the operating position presenting a first planing means confronting one of said end portions and a second planing means confronting the other of said end portions with said first and second planing means mounted as a unit on a support, each planing means having a radially extending blade presenting a cutting edge protruding axially toward a separate end portion of the joints and being rotatable coaxially with the end portions of the joints, means for biasing said discs toward one joint end portion, said discs being movable along the axis of the joints, by movement of one of the joints along its axis into forcible engagement with one of the discs, between a first position at which one of the joints is in contact with one of the discs and a second position at which both joints are in contact with their respective discs for planing a smooth perpendicular surface on the end of each pipe joint.

UNITED STATES PATENT OFFICE
CERTIFICATE OF CORRECTION

Patent No. 3,552,265         Dated January 5, 1971

Inventor(s)  Calvin M. Lucas

It is certified that error appears in the above-identified patent and that said Letters Patent are hereby corrected as shown below:

Column 4, line 14, "if" should read -- is --.

Signed and sealed this 1st day of June 1971.

(SEAL)
Attest:

EDWARD M. FLETCHER, JR.                WILLIAM E. SCHUYLER, JR.
Attesting Officer                      Commissioner of Patents